Aug. 27, 1968     F. J. CLAFFEY     3,398,895
COOLED FUEL INJECTION NOZZLE
Filed March 30, 1966
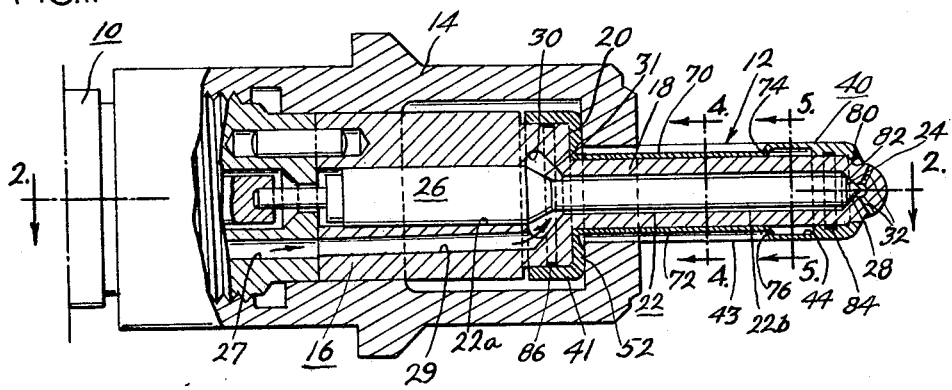
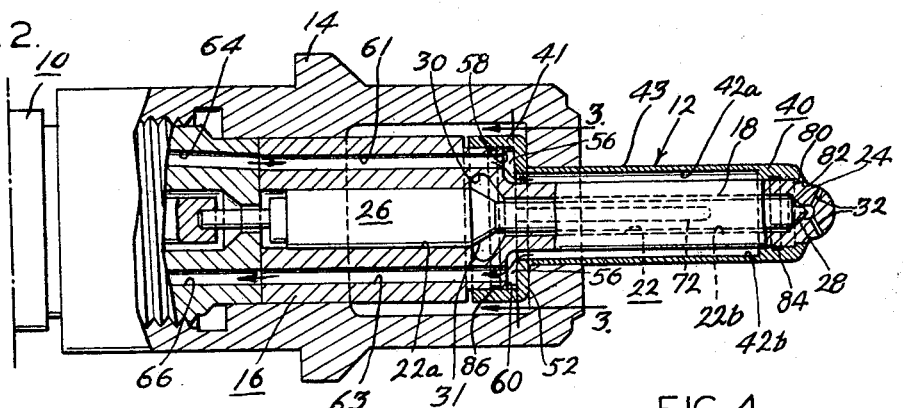
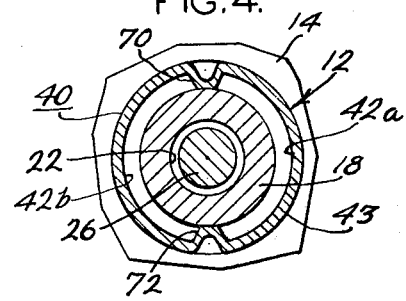
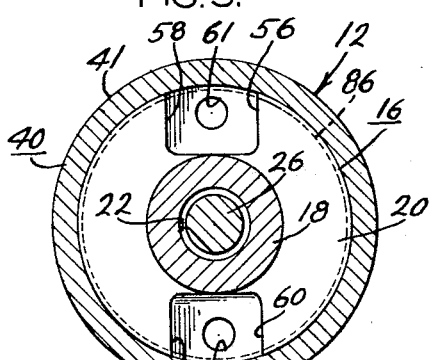
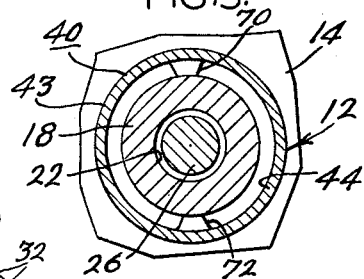
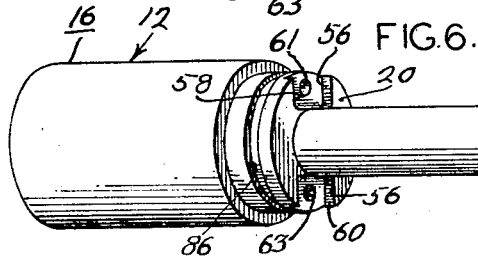
INVENTOR:
FRANK J. CLAFFEY
BY Howson & Howson
ATTYS.

United States Patent Office 3,398,895
Patented Aug. 27, 1968

3,398,895
COOLED FUEL INJECTION NOZZLE
Frank J. Claffey, East Hampton, Conn., assignor to American Bosch Arma Corporation, Springfield, Mass., a corporation of New York
Filed Mar. 30, 1966, Ser. No. 538,785
5 Claims. (Cl. 239—132.3)

ABSTRACT OF THE DISCLOSURE

An improvement in a fuel injection nozzle for internal combustion engines which generally comprise a cylindrical nozzle body, an elongated nozzle tip projecting from one end of the nozzle body and a jacket including a cup portion in which the lower portion of the nozzle body is nested and a hollow sleeve depending from the cup portion circumscribing and coextensive with the nozzle tip. The present invention is directed to an improvement consisting in the nozzle tip being of uniform cross section for substantially its entire length and the sleeve portion being of cylindrical form and of a larger internal diameter than the nozzle tip to provide an annular space therebetween. The sleeve portion is of a deformable material so that it may be crimped to define a pair of elongated diametrically opposed, longitudinally extending, inwardly directed ribs defining inlet and outlet coolant passageways between the nozzle tip and sleeve. The ribs terminate at a point spaced upwardly from the free terminal end of the sleeve and nozzle tip to define an annular coolant chamber adjacent the nozzle tip. Means is provided to connect the cup to the nozzle body and the lower free end of the sleeve to the nozzle tip.

---

The present invention relates to fuel injection nozzles for internal combustion engines and more particularly to a cooled injection nozzle.

The fuel injection nozzle of the present invention is an improvement over the nozzle shown in our prior Patent No. 3,128,948. The nozzle arrangement illustrated in our prior patent includes an elongated nozzle tip and a generally cylindrical jacket or sleeve surrounding the nozzle tip, secured at opposite ends to the nozzle tip by means of a brazed connection. Diametrically opposed wall portions of the nozzle tip are cut away to define a pair of radially projecting lobes or projections which bear tightly against the sleeve and which terminate upwardly from one end of the tip to define a circumferentially extending annulus or cooling chamber adjacent the free end of the nozzle tip. This circumferentially extending annulus is in fluid communication with the passageways defined by the undercut portion of the nozzle body between the lobes and the inner wall of the jacket.

Even though it has been found that this construction is generally suitable for the purposes intended, nevertheless, the entire assembly is comparatively expensive to make by reason of the fact that the nozzle tip requires precise machining to form the lobes and the circumferentially extending annulus at one end.

Furthermore, since the nozzle tip is not of uniform cross section throughout its entire length, there is the possibility of distortion during, for example, heat treatment or in operation in an engine. Furthermore, in these prior assemblies, the jacket is secured to the nozzle for example by a brazed connection, which operation might cause distortion of the nozzle.

With the foregoing in mind, an object of the present invention is to provide a cooled injection nozzle having novel features of construction and arrangement including a nozzle tip of uniform cross section throughout the major part of its length whereby the nozzle may withstand high temperature conditions effectively during heat treatment and in operation in an engine without the danger of distortion.

A further object of the present invention is to provide a compact nozzle assembly which is relatively easy and economical to manufacture and assemble.

These and other objects of the present invention and the various structural details thereof are hereinafter more fully set forth with reference to the accompanying drawing, in which:

FIG. 1 is a side elevational view partly in section of a fuel injection nozzle and holder constructed in accordance with the present invention;

FIG. 2 is a sectional view taken on lines 2—2 of FIG. 1;

FIG. 3 is an enlarged sectional view taken on lines 3—3 of FIG. 2;

FIGS. 4 and 5 are enlarged sectional views taken on lines 4—4 and 5—5 of FIG. 1, respectively; and FIG. 6 is a perspective view of the nozzle body and tip.

Referring now to the drawing and particularly to FIGS. 1 and 2 thereof, there is illustrated an assembly of a nozzle holder 10 and a fuel injection nozzle 12 in accordance with the present invention supported on the lower axial end of the holder 10 by means of a cap nut 14. The nozzle 12 comprises a generally cylindrical body portion 16, an elongated nozzle tip 18 projecting from one end of the body 16 of a reduced cross section to define a radial shoulder 20 at the juncture of the nozzle tip and body. Further, as illustrated, the nozzle has a longitudinally extending bore 22 which is stepped to define an upper bore section 22a and a lower bore section 22b which terminates in a conical seat 24 adjacent the lower end of the nozzle tip. A valve element 26 is mounted in the bore 22 which is normally biased downwardly so that its conical tip 28 rests on the conical seat 24 and has a tapered conical annular shoulder. As best illustrated in FIG. 1, aligned fuel passageways 27 and 29 are provided in the holder 10 and nozzle body portion 16 respectively directing fuel from a suitable source to an annular chamber 30 at the step of the axial bore in the nozzle.

Thus, when the fuel pressure acting on a conical shoulder 31 of the valve builds up to overcome the force biasing the valve to a closed position, the valve is raised whereby the fuel passes from the chamber 30 and the annular space between the valve and bore 22 through orifices 32 in the nozzle tip and into the engine cylinder or combustion chamber.

In accordance with the present invention, the nozzle is characterized by novel features of construction and arrangement providing for circulation of a coolant therethrough to produce effective cooling of the nozzle and the nozzle tip is of substantially uniform cross section throughout its length providing a unit that is easy and economical to assemble and one which can withstand elevated temperature conditions without danger of distortion. To this end, there is provided a jacket 40 having a cup portion 41 and a sleeve portion 43 depending from the cup 41. The sleeve 43 circumscribes the nozzle tip 18 and is of a configuration to define a pair of diametrically opposed axially extending inlet and outlet coolant passageways 42a and 42b between the sleeve and tip for directing coolant to an annular circumferentially extending cooling chamber 44 adjacent the nozzle tip. As illustrated in FIGS. 1 and 2, the lower end of the nozzle body 16 nests in the cup 41 which, as illustrated, consists of a radial flange 52 abutting the shoulder 20 and a cylindrical skirt projecting upwardly from the outer peripheral edge of the flange 52 and which is adapted to be secured to the nozzle body adjacent the lower end thereof. Diametrically opposed radial slots 56 are provided in the shoulder 20 to form with the radial flange 52 of the jacket short channels 58 and 60 connecting the inlet and outlet passageways 42a and 42b in the nozzle tip with the axially extending conduits 61 and 63 in the nozzle body 16.

Coolant is delivered to the cooling chamber 44 through the holder, and to this end coolant inlet and outlet ports (not shown) are provided in the holder which are adapted to be connected to a suitable coolant supply source and reservoir respectively to facilitate circulation of coolant through the holder and nozzle. The ports communicate respectively with axially extending supply and discharge passages 64 and 66 in the nozzle holder which in turn register with the inlet and outlet conduits 61 and 63 in the nozzle body.

Accordingly, during operation of the nozzle, coolant is continuously supplied to the inlet port in the holder, flows through the supply passage 64, conduit 61, channel 58, passageway 42a to the chamber 44. Coolant circulates through the chamber 44 and passes through the outlet passageway 42b, channel 60, conduit 63, discharge passage 66 to the discharge port in the holder. By this arrangement, rapid, continuous circulation of the coolant through the injection nozzle is assured providing effective cooling of the nozzle.

In accordance with the present invention, the sleeve portion 43 of the jacket 40 is crimped for a portion of its axial length at diametrically opposed points to define a pair of inwardly projecting ribs 70 and 72 which engage the outer peripheral surface of the nozzle tip 18 along a substantial portion of its length thereby to define the axially extending inlet and outlet coolant passageways 42a and 42b. The ribs 70 and 72 terminate adjacent the lower end of the sleeve at a point spaced upwardly from the nozzle tip as at 74 and 76 to define the annular coolant chamber 44 as best illustrated in FIG. 1. This provides a simple and effective arrangement for the cooling system of the nozzle. It is noted that by this arrangement, the nozzle tip 18 may be made a uniform cross section throughout its entire length so that its manufacture is greatly simplified by minimizing machining and finishing operations. Furthermore, the danger of distortion of the nozzle tip 18 due to high temperature applications such as during heat treating of the nozzle or in operation is minimized for the reason that the tip is of uniform cross section for substantially its entire length. The jacket is secured to the nozzle by a simple and fluid-tight joint or connection. To this end, the nozzle tip 18 is stepped adjacent its free terminal end to define an annular abutment shoulder 80 of reduced cross section and the terminal end of the sleeve portion 43 has a circumferentially extending radially inwardly directed lip 82 which snugly engages over the shoulder when the jacket is positioned in place. Further, the sleeve portion 43 has an annular groove 84 spaced upwardly from the radial lip 82 to receive an adhesive such as an epoxy to connect the sleeve to the nozzle tip and provide a leak-proof joint. The side wall of the nozzle body 16 is also provided with an annular groove or recess 86 for receiving an epoxy to provide a leak-proof connection between the nozzle body and cup portion of the jacket.

The overall assembly of a fuel injection nozzle in accordance with the present invention is greatly simplified and the cost of making the nozzle is greatly reduced. For example, the sleeve having the inwardly directed ribs may be manufactured by a simple stamping operation and assembled to the nozzle very easily, simply by placing an epoxy in the annular grooves in the sleeve and nozzle body and then positioning the jacket over the nozzle tip. It is noted that since the nozzle tip is of uniform cross section for substantially its entire length, machining and finishing operations heretofore required to form ribs or lobes in the nozzle body are eliminated. Furthermore there is less danger of nozzle distortion by reason of the uniform cross section. In this connection, since there are no welding operations, the possibility of nozzle distortion resulting from welding is also eliminated.

While a particular embodiment of the present invention has been illustrated and described herein, it is not intended to limit the invention to such disclosure and changes and modifications may be made therein within the scope of the following claims.

I claim:

1. In a fuel injection nozzle for internal combustion engines, a generally cylindrical nozzle body, an elongated nozzle tip projecting from one end of said nozzle body of a uniform cross section for substantially its entire length, a jacket including a cup portion in which the lower end of said nozzle body is nested and a hollow sleeve depending from said cup portion, said sleeve circumscribing and being coextensive with said nozzle tip, the improvement consisting in said sleeve portion being of a cylindrical form and of larger internal diameter than said nozzle tip to provide an annular space therebetween and being of a deformable material so that it may be crimped to define a pair of elongated diametrically opposed longitudinally extending inwardly directed ribs defining inlet and outlet coolant passageways between the nozzle tip and sleeve, said ribs terminating at a point spaced upwardly from the outer free terminal end of the sleeve and nozzle tip to define an annular coolant chamber adjacent the nozzle tip and means connecting said cup to said nozzle body and the lower free terminal end of said sleeve to said nozzle tip.

2. A fuel injection nozzle as claimed in claim 1 wherein said nozzle tip is of reduced cross section to define a shoulder at the juncture of said nozzle body and tip, and including means defining a pair of inlet and outlet coolant conduits in said nozzle body offset radially relative to said passageways and means defining a pair of radial grooves in said shoulder forming inlet and outlet channels connecting said inlet conduit with said inlet passageway and said outlet conduit with said outlet passageway.

3. A fuel injection nozzle as claimed in claim 1 wherein said means connecting said jacket to said nozzle body and tip comprises an adhesive.

4. A fuel injection nozzle as claimed in claim 1 wherein the nozzle tip is stepped adjacent its free terminal end to define an annular abutment of reduced cross section and the terminal end of said sleeve has a circumferentially extending radially inwardly directed lip which snugly seats against the abutment and including means defining an annular groove on the inner wall of said sleeve spaced upwardly from the radial lip to receive an epoxy to connect the sleeve to the nozzle tip and provide a leak-proof joint.

5. A fuel injection nozzle as claimed in claim 4 including an annular recess in the side wall of the nozzle body to receive an epoxy providing a leak-proof connection between the nozzle body and cup portion of the jacket.

References Cited
UNITED STATES PATENTS

| | | | |
|---|---|---|---|
| 1,389,301 | 8/1921 | Gilbert et al. | 239—288.5 X |
| 2,552,679 | 5/1951 | Hogeman | 239—132 |
| 3,128,948 | 4/1964 | De Luca | 239—132.3 |
| 3,224,684 | 12/1965 | Roosa | 239—533 |

M. HENSON WOOD, JR., *Primary Examiner.*

H. NATTER, *Assistant Examiner.*